United States Patent [19]

Newton et al.

[11] Patent Number: 5,867,979
[45] Date of Patent: Feb. 9, 1999

[54] GAS TURBINE ENGINE SYSTEM

[75] Inventors: Arnold C. Newton, Derby; John Sharp, Bristol, both of England

[73] Assignee: Rolls-Royce plc, London, Great Britain

[21] Appl. No.: 812,042

[22] Filed: Mar. 6, 1997

[30] Foreign Application Priority Data

Mar. 28, 1996 [GB] United Kingdom .................... 9606546

[51] Int. Cl.$^6$ ........................................................ F02K 3/02
[52] U.S. Cl. ...................... 60/226.1; 60/39.142; 290/540; 310/90.5
[58] Field of Search ................................... 60/226.1, 262, 60/39.141, 39.142, 39.33; 310/90.5; 290/42, 43, 53, 54

[56] References Cited

U.S. PATENT DOCUMENTS

| | | | |
|---|---|---|---|
| 4,062,185 | 12/1977 | Snow | 60/266.1 |
| 4,068,470 | 1/1978 | Sargisson et al. | 60/226.1 |
| 5,152,141 | 10/1992 | Rumford et al. | 60/39.142 |
| 5,309,029 | 5/1994 | Gregory et al. | |
| 5,349,814 | 9/1994 | Ciokajlo et al. | 60/39.142 |
| 5,376,827 | 12/1994 | Hines . | |
| 5,687,561 | 11/1997 | Newton | 60/226.1 |

FOREIGN PATENT DOCUMENTS

| | | |
|---|---|---|
| 1300055 | 6/1962 | France . |
| 839 961 | 6/1960 | United Kingdom . |
| 1 340 363 | 12/1973 | United Kingdom . |

*Primary Examiner*—Charles G. Freay
*Attorney, Agent, or Firm*—W. Warren Taltavull; Farkas & Manelli PLLC

[57] ABSTRACT

An aircraft mounted gas turbine engine system comprises a three shaft propulsive gas turbine engine having three electrical generators; each one respectively associated with one shaft of the engine. Two of the electrical generators are additionally configured so as to function as electric motors so as to facilitate power transfer between the engine shafts. One of the electric generators provides the primary source of electrical power for the aircraft, while the remaining electrical generators provide electrical power for the engine and back-up power for the aircraft.

16 Claims, 4 Drawing Sheets

GAS TURBINE ENGINE SYSTEM

THE FIELD OF THE INVENTION

This invention relates to aircraft mounted gas turbine engine systems and in particular to the manner in which such systems generate and utilise electrical and other power.

BACKGROUND OF THE INVENTION

An aircraft, and the gas turbine engines that power it, usually include numerous units that require electrical, hydraulic or pneumatic power in order to function. Conventionally, the power for such units is derived from one of three sources depending upon the operating status of the aircraft. If the aircraft is stationary and it is necessary for certain electrical support systems to be operational, a ground-based electrical generator is coupled to the aircraft. Alternatively, the electrical power may be derived from an aircraft mounted generator which is powered by an auxiliary power unit mounted on the aircraft. Such an auxiliary power unit is commonly in the form of a small gas turbine engine mounted in the tail region of the aircraft.

If the aircraft is airborne, power for the units is derived from the engines which power the aircraft. Typically, each engine is provided with an auxiliary shaft that transmits power from one of the main shafts of the engine to a gearbox mounted on the engine external casing. The gearbox in turn drives various electrical generators and hydraulic pumps. A single electrical generator may be driven by the gearbox. However in the event of the failure of that generator, there would, of course, be an interruption in the supply of electrical power to the engine and aircraft. In a multi-engined aircraft such an interruption may be acceptable for a short time period since electrical power is still likely to be available from the remaining engine or engines. However, if the aircraft is required to fly in regions in which a diversionary airfield is some distance away, it is usually necessary for the gearbox to drive an additional electrical generator for back-up purposes.

Such duplication of electrical power generators leads to difficulties in conveniently positioning them relative to the gearbox and also to complex and heavy modifications to the gearbox to enable it to drive both generators.

SUMMARY OF THE INVENTION

It is a general object of the present invention to provide an aircraft mounted gas turbine engine system in which such drawbacks are substantially avoided.

According to the present invention, an aircraft mounted gas turbine engine system comprises a propulsive gas turbine engine having a core unit that includes compressor and turbine portions and a propulsive fan driven by said core unit, said engine including a plurality of independent shafts drivingly connecting said turbine portions to said compressor portions and to said fan, each of said shafts independently and directly driving an electrical generator, one of said electrical generators operationally constituting the primary source of electrical power for the aircraft carrying said engine.

Since each electrical generator is independently and directly driven by one of the main engine shafts, there is no longer any requirement for the main engine gearbox to be capable of driving two generators and so it may be suitably down-sized or even eliminated. Moreover, the generators may be positioned in convenient positions which are not necessarily close to the engine gearbox if such a gearbox is fitted.

If the generators are not associated with the main engine gearbox, it then becomes possible to mount them within the core unit of the gas turbine engine. Moreover, if the electrical generators are of the type that also function as electric motors, it is possible to transfer power between the engine shafts in the manner described in our PCT patent application Ser. No. WO 95/02120. It also permits the use of at least one of the electric motors for engine starting purposes.

We prefer that in addition to each of the electrical generators performing the function of an electric motor, they are configured so that they also function as electromagnetic bearings. This brings important advantages in terms of simplifying the overall structure of the engine and providing the means for greater control over engine operation.

If electromagnetic bearings are employed in the engine, we prefer that the auxiliary power unit of the aircraft on which the engine is mounted is integrated into the gas turbine engine system. By doing so, the auxiliary power unit can be used for providing the electrical power for electromagnetic bearing levitation, for instance, prior to the operation of the gas turbine engine.

BRIEF DESCRIPTION OF THE DRAWINGS

The present invention will now be described, by way of example, with reference to the accompanying drawings in which.

DETAILED DESCRIPTION OF THE INVENTION

Figure 1:
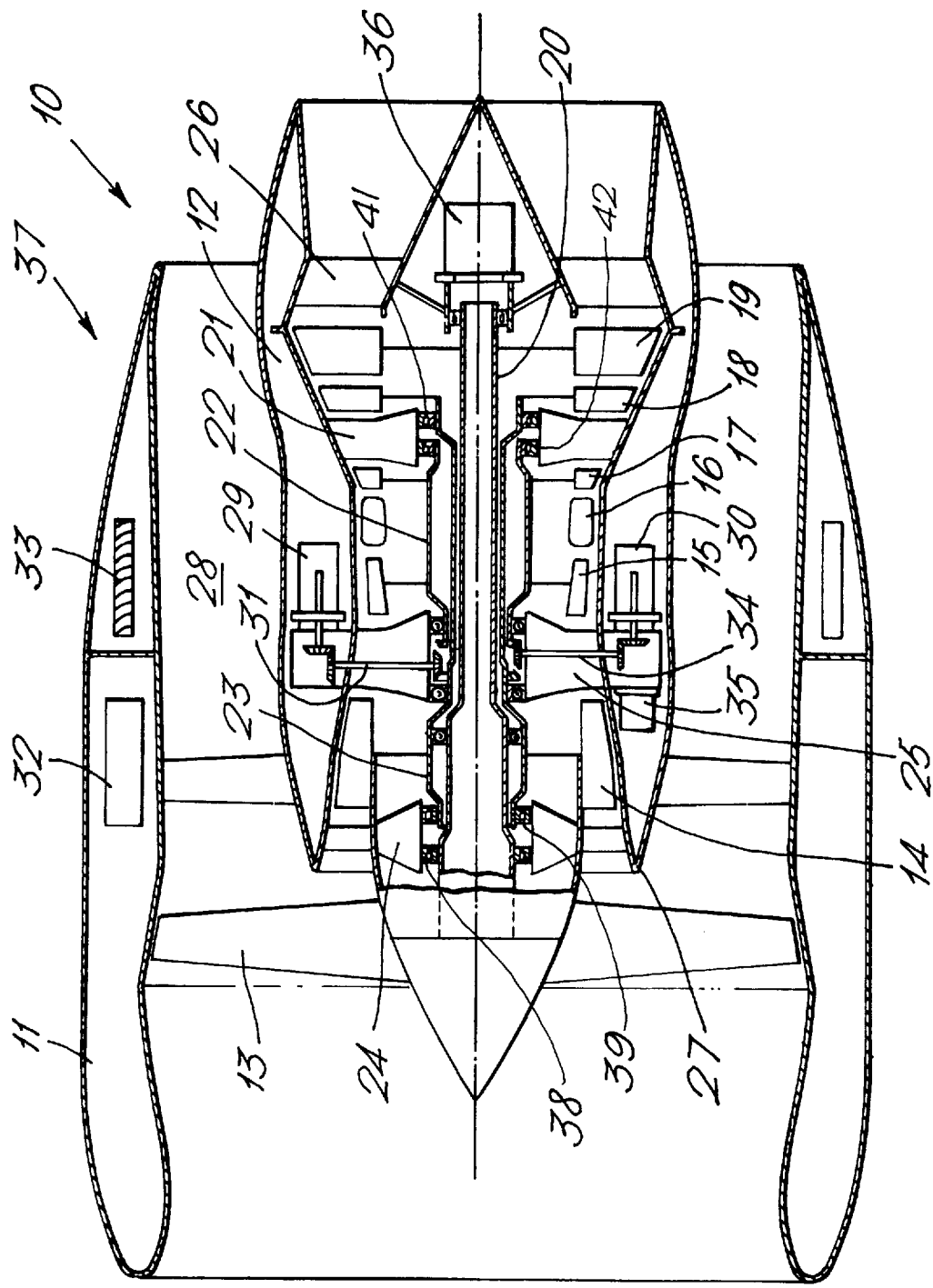
FIG. 1 is a sectioned side view of a ducted fan gas turbine engine for use in one version of a gas turbine engine system in accordance with the present invention.

With reference to FIG. 1, a ducted fan gas turbine engine generally indicated at 10 is of mainly conventional configuration. It comprises a nacelle 11 which encloses a core unit 12 and a propulsive fan 13 driven by the core unit 12. The core unit 12 includes intermediate and high pressure compressors 14 and 15 respectively, combustion equipment 16, and high, intermediate and low pressure turbines 17, 18 and 19 respectively.

Three hollow concentric shafts 20, 22 and 23 interconnect the various turbines 17, 18 and 19 with the compressors 14 and 15 and the fan 13. More specifically, the radially innermost shaft 20 interconnects the low pressure turbine 19 with the fan 13, the radially outermost shaft 22 interconnects the high pressure turbine 17 with the high pressure compressor 15 and the mid-shaft 23 interconnects the intermediate pressure turbine 18 with the intermediate pressure compressor 14.

Bearing support structures 21, 24, 25 and 26, each including a series of radially extending struts, are positioned at the front, mid-region and rear of the core unit 12 to support the shafts 20, 22 and 23 on conventional roller bearings. Thus the mid-region bearing support structures 21 and 25 provide support for the radially outermost and mid-shafts 22 and 23 while the front and rear bearing support structures 24 and 26 provide support for the mid-shaft 23 and the radially innermost shaft 20.

The engine 10 operates in the conventional manner so that air entering the nacelle 11 at its upstream end (the left hand end when viewed in FIG. 1) is partially compressed by the fan 13. The air exhausted from the fan 13 is divided by the upstream edge 27 of the core unit 12 into two concentric flows. The outermost flow of air is directed into an annular duct 28 defined between the inner surface of the nacelle 11 and the outer surface of the core unit 12. That airflow is then exhausted to atmosphere at the downstream end of the nacelle 11 to provide propulsive thrust.

The innermost flow of air is directed into the core unit 12 where it is compressed further by the intermediate and high pressure compressors 14 and 15. The air is then directed into the combustion equipment 16 where it is mixed with fuel and the mixture combusted. The resultant hot combustion products then expand through, and thereby drive, the high, intermediate and low pressure turbines 17, 18 and 19 before exhausting to atmosphere from the downstream end of the core unit 12 to provide additional propulsive thrust. The turbines 17, 18 and 19 drive the compressors 15 and 14 and the fan 13 respectively.

Although the engine 10 has been described as having three concentric drive shafts 20, 22 and 23, it will be appreciated that it could, if so desired, have only two shafts so that low and intermediate pressure compressor and turbine systems are mounted on a common shaft.

Conventionally, the nacelle 11 is provided within its walls with a gearbox which is driven by the radially outermost shaft 22 via a radially extending auxiliary drive shaft extending through one of the mid-region bearing support structures 21 and 25 and across the fan duct 28. However, in the case of the present invention, such a gearbox is omitted. Instead, the wall of the core unit 12 has positioned within it two similar electrical motor/generator units 29 and 30.

The first motor/generator 29 is positioned in the upper region of the core unit 12. It is driven by the engine mid-shaft 23 via a drive shaft 31 that extends through one of the radially extending struts in the bearing support structure 25. Electrical power generated by the motor/generator 29 during normal engine operation is used primarily to power the electrical systems that are specific to the engine 10 such as its full authority digital electric control system 32 located in the wall of the nacelle 11. In addition, electrical power from the motor/generator 29 is used to power engine accessories that are not normally electrically powered such as the variable inlet guide vanes, the compressor bleed valves and the thrust reverser 33. Conventionally thrust reversers are hydraulically powered in the conventional manner using hydraulic pumps driven by the main engine gearbox.

Any excess power generated by the motor/generator 29 is directed, as required, to the main power supply system for the aircraft on which the engine 10 is operationally mounted.

The second motor/generator 30 is positioned in the lower region of the core unit 12. It is driven by the radially outermost engine shaft 22 via a driveshaft 34 located in another of the struts in the bearing support structure 25. Electrical power generated by the second motor/generator 30 during normal engine operation is primarily utilised as standby power for the aircraft on which the engine 10 is mounted. However, the primary function of the second motor/generator 30 is as a means for starting the engine 10. Thus when it is desired to start the engine 10, electrical power from a suitable external source is directed to the second motor/generator 30. This causes rotation of the outermost shaft 22 interconnecting the high pressure compressor 15 and turbine 17. Sufficient air is compressed by the high pressure compressor 15 to sustain the combustion process within the combustion equipment 16 and thereby bring about the commencement of engine operation.

The motor/generator 30 additionally drives a small gearbox 35 which if required provides power for pumping fuel and oil within the engine 10.

The primary source of electrical power for the aircraft upon which the engine 10 is mounted is an electrical motor/generator 36 positioned within the downstream bearing support structure 26 at the downstream end of the innermost engine shaft 20. Powering the primary aircraft electrical motor/generator 36 by the innermost engine shaft 20 has the advantage of providing an emergency source of electrical power in the event of a failure of the engine 10. If the engine 10 ceases operation during aircraft flight, air flowing over the fan 13 causes rotation of the fan 13 by the "windmill" effect, and hence operation of the electrical generator 36. The advantage of this is that the aircraft no longer requires the provision of a separate ram air turbine to cope with the loss of electrical power resulting from engine failure. Such ram air turbines impose undesirable weight penalties on the aircraft.

The gas turbine engine power system described with reference to FIG. 1 provides useful advantages over a conventional ducted fan gas turbine engine. Elimination of the main engine gearbox and two electrical generators driven by the gearbox means that the shape of the nacelle 11 can be optimised without the constraints imposed by the presence of the gearbox. Multiple sources of electrical power generation within the engine ensure that adequate electrical power generation capacity is available in the event of the failure of one of the generators. A further benefit is that power can be transferred between the main engine shafts 20, 22 and 23 in the manner described in our co-pending PCT patent application no. WO 95/02120.

Figure 2:
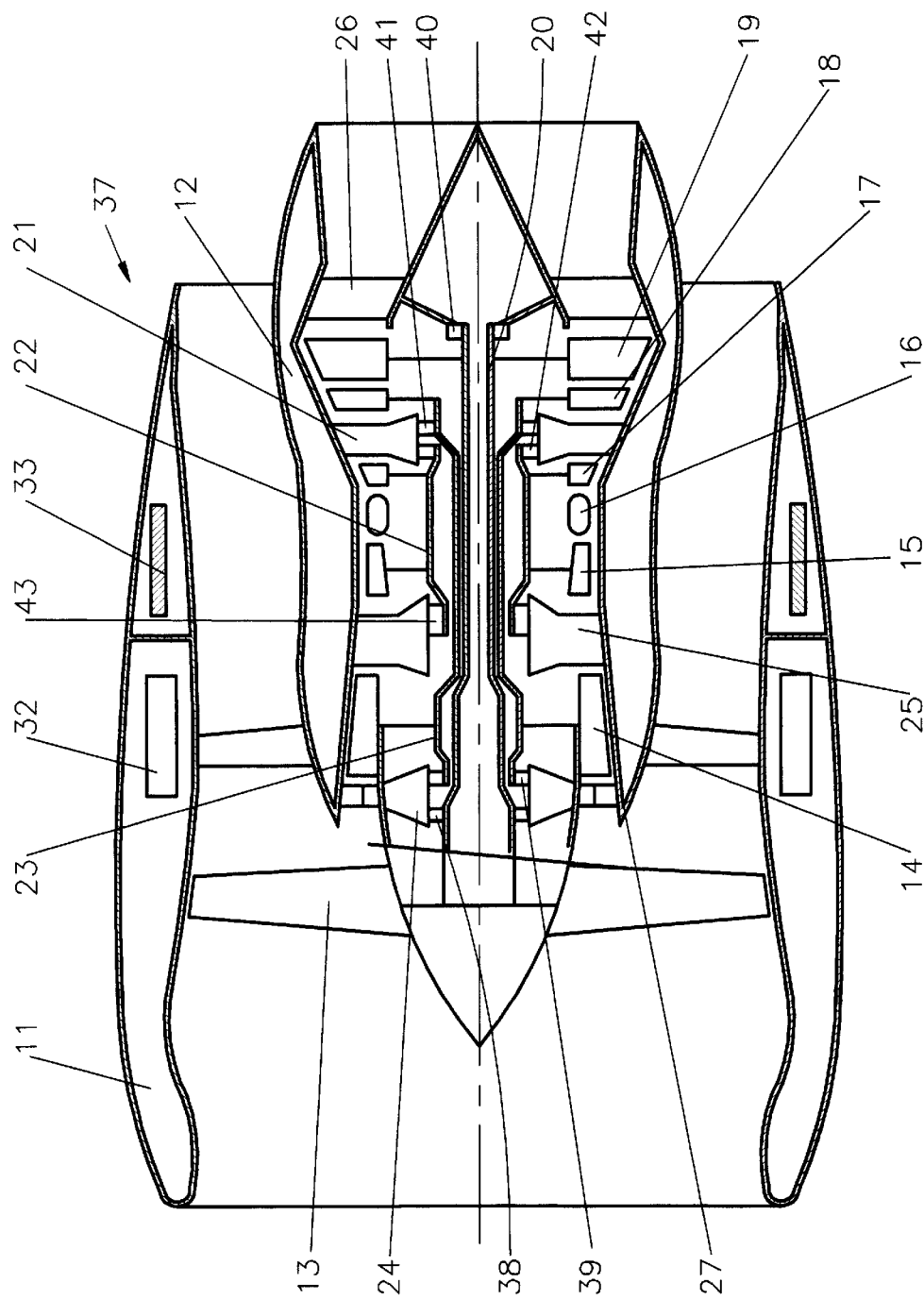
FIG. 2 is a sectioned side view of an alternative type of ducted fan gas turbine engine for use in another version of a gas turbine engine system in accordance with the present invention.

Further benefits may be enjoyed if the ducted fan gas turbine engine is of the type which is shown in FIG. 2. The basic components of the engine 37 shown in FIG. 2 are the same as those of the engine shown in FIG. 1. Consequently components common to both engines 10 and 37 are given the same identification numbers and will not therefore be described in detail.

The major difference between the ducted fan gas turbine engine 37 shown in FIG. 2 and that 10 shown in FIG. 1 is in the bearing arrangements for supporting the main engine shafts 20, 22 and 23. In the case of the engine 37, all of the bearings supporting the main engine bearing shafts 20, 22 and 23 are of the electromagnetic type.

More specifically, the front bearing support structure 24 carries two spaced apart electromagnetic bearings 38 and 39. The upstream electromagnetic bearing 38 supports the upstream end of the radially innermost shaft 20. The downstream end of the radially innermost shaft 20 is supported by a further electromagnetic bearing 40 which is carried by the downstream bearing support structure 26. The upstream electromagnetic bearing 38 is so configured that it additionally functions as an electrical generator and an electric motor. Electricity generated by the bearing 38 constitutes the primary source of electricity for the aircraft upon which the engine 37 is mounted.

The other electromagnetic bearing 39 carried by the front bearing support structure 24 supports the upstream end of the mid-shaft 22. The electromagnetic bearing 39 is also of the type which is so configured that it also functions as both an electrical generator and an electric motor. Electricity generated by the bearing 39 is used in the main for providing all of the electrical supply requirements of the engine 37. The downstream end of the mid-shaft 22 is supported by an electromagnetic bearing 41 carried by the bearing support structure 21.

The mid-region bearing support structure 21 also carries an electromagnetic bearing 42 which supports the downstream end of the radially outer shaft 22. The upstream end of the radially outer shaft 22 is supported by an electromagnetic bearing 43 carried by the other mid-region bearing support structure 25. Like the electromagnetic bearings 38 and 39, the electromagnetic bearing 43 is of the type which also functions both as an electrical generator and an electric motor. Electricity generated by the bearing 43 is utilised as a standby source of electrical power for the aircraft upon which the engine 37 is mounted. The bearing 43 functions as an electric motor during engine starting when it is used to rotate the radially outer shaft 22 in the manner described earlier.

As in the case of the engine 10 described earlier, the provision of electrical generators and electric motors on all of the shafts 20, 22 and 23 ensures that power transfer between the shafts 20, 22 and 23 is possible in the manner described in our co-pending PCT application Ser. No. WO95/02120.

The use of electromagnetic bearings in the engine 37 brings important benefits in terms of overall engine operating efficiency. Thus it permits the total elimination of a conventional oil lubrication system with its problems of zoning and screening. It also permits the introduction of such desirable features as programmed control of shaft end loads, shaft bow effects following engine shut-down and subsequent rapid restart, shaft dynamics and imbalance effects and compressor and/or turbine blade tip clearances through axial shaft location.

Figure 3:
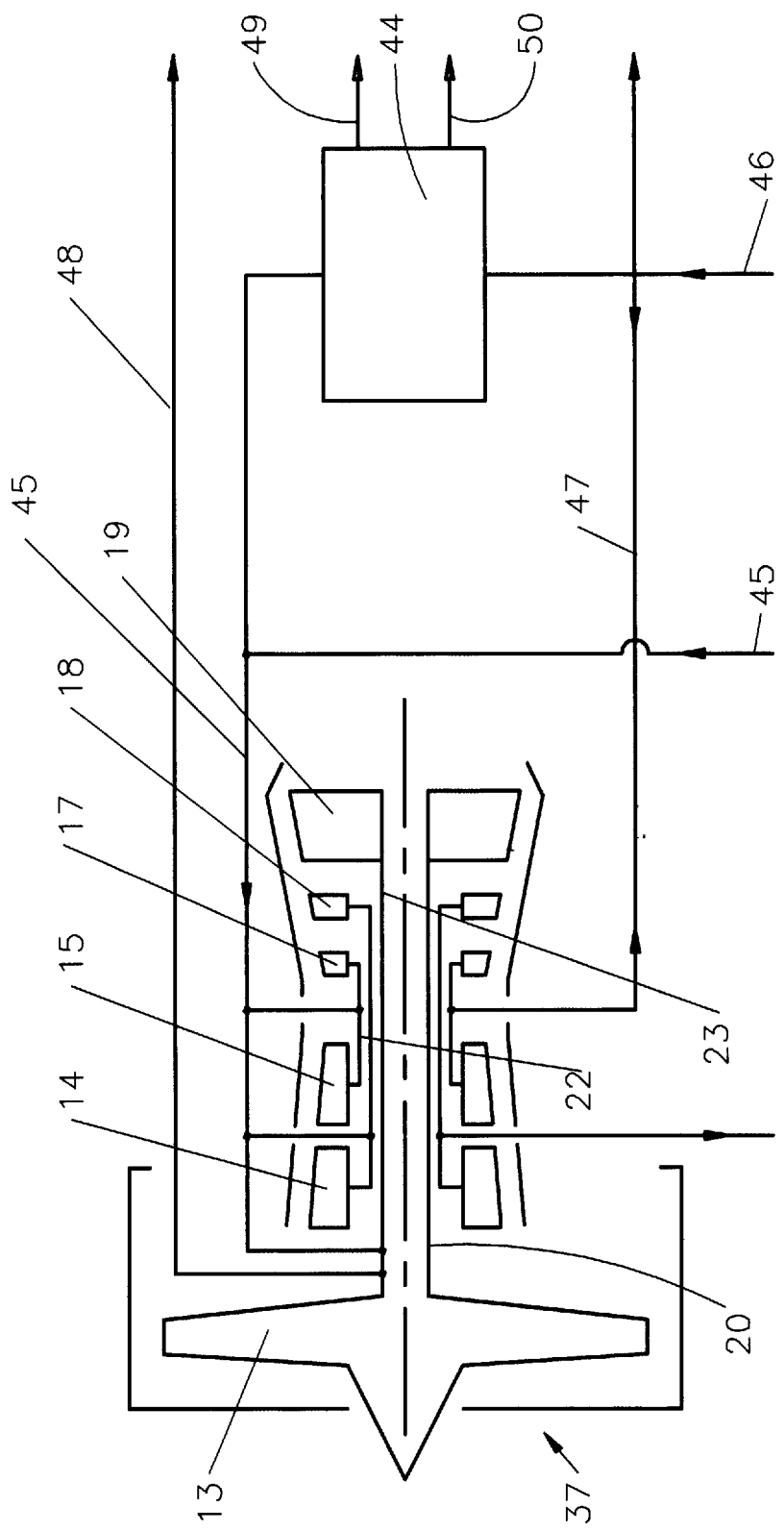
FIG. 3 is a schematic view of one example of a gas turbine engine system in accordance with the present invention.

If electromagnetic bearings are utilised in a gas turbine engine as is the case with the engine 37, it becomes possible to integrate the operation of the engine with that of the auxiliary power unit carried by the aircraft which incorporates the engine 37. The manner in which this can be achieved can be seen more easily if reference is now made to FIG. 3. In FIG. 3 the engine 37 is shown in simplistic schematic form as is the auxiliary power unit 44. The auxiliary power unit 44 is of the conventional aircraft mounted gas turbine type.

Before the engine 37 can be started, it is, of course, necessary to direct an electric current to the electromagnetic bearings 38, 39, 40, 41, 42 and 43 in order to levitate them. The electric current may be derived from a ground source 45, a battery carried by the aircraft or from a conventional electric generator associated with the auxiliary power unit 44. Irrespective of its source, the electrical supply is directed along a line 45 to each of the electromagnetic bearings 38, 29, 40, 41, 42 and 43. As soon as bearing levitation has been achieved, a further ground electrical supply 46 is directed through a line 47 to the electromagnetic bearing 43 supporting the radially outer shaft 22. This causes the electromagnetic bearing 43 to function as an electric motor and thereby bring about rotation of the radially outer shaft 22.

When the radially outer shaft 22 reaches a rotational speed sufficient to sustain operation of the engine 37, fuel is supplied to the combustion equipment 16 and ignition is commenced. As soon as effective engine operation is achieved, the electrical generators incorporated into the electromagnetic bearings 38, 39 and 43 provide sufficient electrical power to sustain the electrical demands of the engine 37 and of aircraft upon which it is mounted. Consequently the ground supplies of electricity 45 and 46 or aircraft battery as the case may be can at this point be discontinued.

During normal operation of the engine 37, the electrical generator incorporated into the electromagnetic bearing 38 supporting the radially inner shaft 20 provides the main electrical supply for the aircraft carrying the engine 37 through the line 48. The backup electrical supply for the aircraft is provided through the line 47 by the electrical generator incorporated into the electromagnetic bearing 43 supporting the radially outer shaft 22. Finally the electrical generator incorporated into the electromagnetic bearing 39 supporting the mid-shaft 23 provides the electrical supply for all of the electrical items associated with the engine 37, including, of course, its electromagnetic bearings.

The auxiliary power unit 44 is arranged to operate at least at all times that the main engine 37 is operating. This is in complete contrast to normal auxiliary power unit operation in which the unit ceases operation as soon as the main engine is operational. It provides two outputs 49 and 50. The output is of compressed air and is directed to the aircraft in order to provide a pressurised air supply for the aircraft cabin. Consequently, it is not necessary to tap air from the compressor system of the engine 37 to provide cabin air for the aircraft. The compromise in engine operating efficiency resulting from tapping air from the engine compressor system is thereby avoided.

The second output 50 from the auxiliary power unit 44 is of pressurised hydraulic fluid. This is to power hydraulically driven accessories on the aircraft if such accessories are carried by the aircraft.

In the event of a failure of the engine 37, the auxiliary power unit 44 can, if desired, provide a continuous supply of electrical power to the electromagnetic bearings 38–43, thereby permitting the engine 37 to continue to rotate and generate electricity by the "windmill" effect described earlier. Alternatively, in a multi-engined aircraft electrical power generated by the other engine or engines could be used to levitate the electromagnetic bearings 38–43.

It will be seen therefore that the integration of the gas turbine engine 37 with the auxiliary power unit 44 provides a gas turbine engine system that brings about great flexibility in the way in which it is used to power the aircraft on which it is mounted and the various accessories with which it is associated. Thus, together, the turbine engine 37 and the auxiliary power unit 44 provide a number of different power sources that can be re-distributed between the engine and aircraft in accordance with the most efficient manner of operating the engine/aircraft combination. This means that the potential for overall engine propulsion efficiency improvements is high in view of the potential for using more aggressive engine cycle choices. Additionally, there is further potential for engine cycle performance and control system improvements through the use of electromagnetic bearings and the transfer of power between the various shafts 20, 22 and 23 of the engine 37. Weight and cost savings are further benefits to be enjoyed through systems integration.

Figure 4:
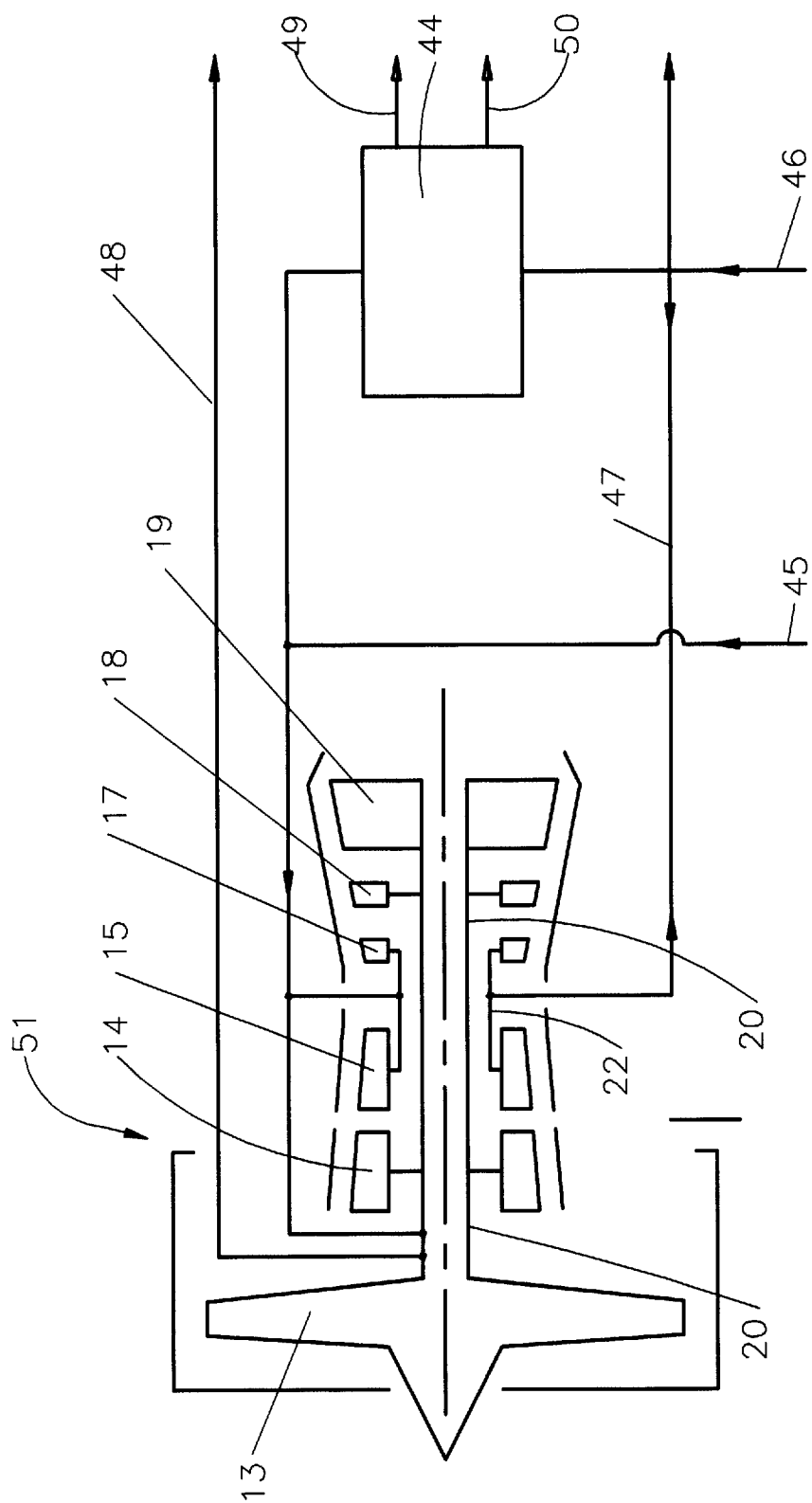
FIG. 4 is a schematic view of a further example of a gas turbine engine system in accordance with the present invention.

Although the engine 37 described above is of the type having three main shafts 20, 22 and 23, the present invention is applicable in its broadest aspect to two shaft engines of the type 51 shown in FIG. 4. The general features of the gas turbine engine/auxiliary power unit arrangement shown in FIG. 4 are very similar to those already described with reference to FIG. 3 and so common parts are depicted by common reference numerals. The only difference of significance is that the absence of a mid-shaft 23 means that electrical power for the engine 51 is derived from the radially outer shaft 22 through the line 47. Line 47 still performs its other function of providing back-up electrical power for the aircraft.

We claim:

1. An aircraft mounted gas turbine engine system comprising a propulsive gas turbine engine having a core unit that includes compressor and turbine portions and a propulsive fan driven by said core unit, said engine including a plurality of electrical generators and a plurality of independent shafts with at least one of said shafts connected between a said turbine portion and a said compressor portion and one other of said shafts connected between another said turbine portion and another said compressor portion and with one of said shafts connected to said fan, each of said shafts independently driving one of said electrical generators, one of said electrical generators operationally constituting a primary source of electrical power for the aircraft carrying said engine.

2. An aircraft mounted gas turbine engine system as claimed in claim 1 wherein each of said electrical generators is mounted within the core unit of said engine.

3. An aircraft mounted gas turbine engine system as claimed in claim 1 wherein said electrical generator operationally providing said primary source of electrical power for the aircraft carrying said engine is driven by the shaft that drives said fan.

4. An aircraft mounted gas turbine engine system as claimed in claim 1 wherein said electrical generators are configured so as to additionally function as electric motors.

5. An aircraft mounted gas turbine engine system as claimed in claim 4 wherein means are provided to facilitate the transfer of power between the shafts of said engine.

6. An aircraft mounted gas turbine engine system as claimed in claim 1 wherein said system additionally includes an aircraft mounted auxiliary power unit.

7. An aircraft mounted gas turbine engine system as claimed in claim 6 wherein said auxiliary power unit provides pneumatic power for the aircraft carrying said gas turbine engine system.

8. An aircraft mounted gas turbine engine system as claimed in claim 6 wherein said auxiliary power unit provides hydraulic power for the aircraft carrying said gas turbine engine system.

9. An aircraft mounted gas turbine engine system as claimed in claim 1 wherein at least one of said shafts is supported by an electromagnetic bearing.

10. An aircraft mounted gas turbine engine system as claimed in claim 9 wherein all of said shafts are supported by electromagnetic bearings.

11. An aircraft mounted gas turbine engine system as claimed in claim 9 wherein each of said electromagnetic bearings is so configured as to constitute a part of one of said electrical generators.

12. An aircraft mounted gas turbine engine system as claimed in claim 9 wherein an auxiliary power unit is provided and is arranged to provide electrical power to levitate said electromagnetic bearing during at least part of the time when said engine is operating.

13. An aircraft mounted gas turbine engine system as claimed in claim 1 wherein said gas turbine engine is of the type having three concentric main shafts.

14. An aircraft mounted gas turbine engine system as claimed in claim 13 wherein the electrical generator associated with the radially innermost shaft provides the main source of electrical power for the aircraft upon which said engine is mounted, the electrical generator associated with the mid-shaft provides the primary source of electrical power for said gas turbine engine and the electrical generator associated with radially outer shaft provides the main source of back-up power for said aircraft.

15. An aircraft mounted gas turbine engine system as claimed in claim 1 wherein substantially all of the systems of said aircraft are electrically powered.

16. An aircraft mounted gas turbine engine system as claimed in claim 1 wherein said engine is of the type that includes electromagnetic bearings for said shafts, variable inlet guide vanes, compressor bleed valves, a digital engine control system and a thrust reverser, each of which is electrically powered.

* * * * *